United States Patent [19]

Farrell

[11] Patent Number: 4,653,244

[45] Date of Patent: Mar. 31, 1987

[54] FASTENER ELEMENT

[76] Inventor: Mark A. Farrell, 6371 Acacia Hill Dr., Yorba Linda, Calif. 92686

[21] Appl. No.: 819,763

[22] Filed: Jan. 16, 1986

[51] Int. Cl.$^4$ .................. F16B 35/06; F16B 23/00; E04B 1/00
[52] U.S. Cl. .................... 52/741; 411/399; 411/412; 411/413
[58] Field of Search .............. 52/363, 364, 741; 411/399, 413, 412, 400

[56] References Cited

U.S. PATENT DOCUMENTS

| Re. 28,111 | 8/1974 | Laverty . | |
|---|---|---|---|
| 1,175,665 | 3/1916 | Sweet . | |
| 2,633,049 | 3/1953 | Anderson | 52/363 X |
| 3,177,755 | 4/1965 | Kahn | 411/399 X |
| 3,478,639 | 11/1969 | Gruca . | |
| 3,703,843 | 11/1972 | Laverty . | |
| 3,861,269 | 1/1975 | Laverty . | |
| 3,942,405 | 3/1976 | Wagner . | |

FOREIGN PATENT DOCUMENTS

| 682956 | 10/1939 | Fed. Rep. of Germany | 52/363 |
|---|---|---|---|
| 684821 | 12/1952 | United Kingdom | 411/399 |
| 1068245 | 5/1967 | United Kingdom | 52/364 |

OTHER PUBLICATIONS

*Construction Dimensions* Magazine, Nov. 1985 advertisement of John Wagner Associates, Inc. (two pages).

*Primary Examiner*—Alfred C. Perham
*Attorney, Agent, or Firm*—Nilsson, Robbins, Dalgarn, Berliner, Carson & Wurst

[57] ABSTRACT

A fastener for use in securing wallboard such as drywall to a supporting structure includes a shank having a bugle head at one end and a tapered point at an opposite end, an annular ring flange and anti-clockwise threads disposed on the shank adjacent the head portion to auger and recompact particulate material which exhausts from the tapping threads during insertion of the fastener, and to tuck the outer sheeting layer evenly beneath the bugle head of the fastener.

8 Claims, 2 Drawing Figures

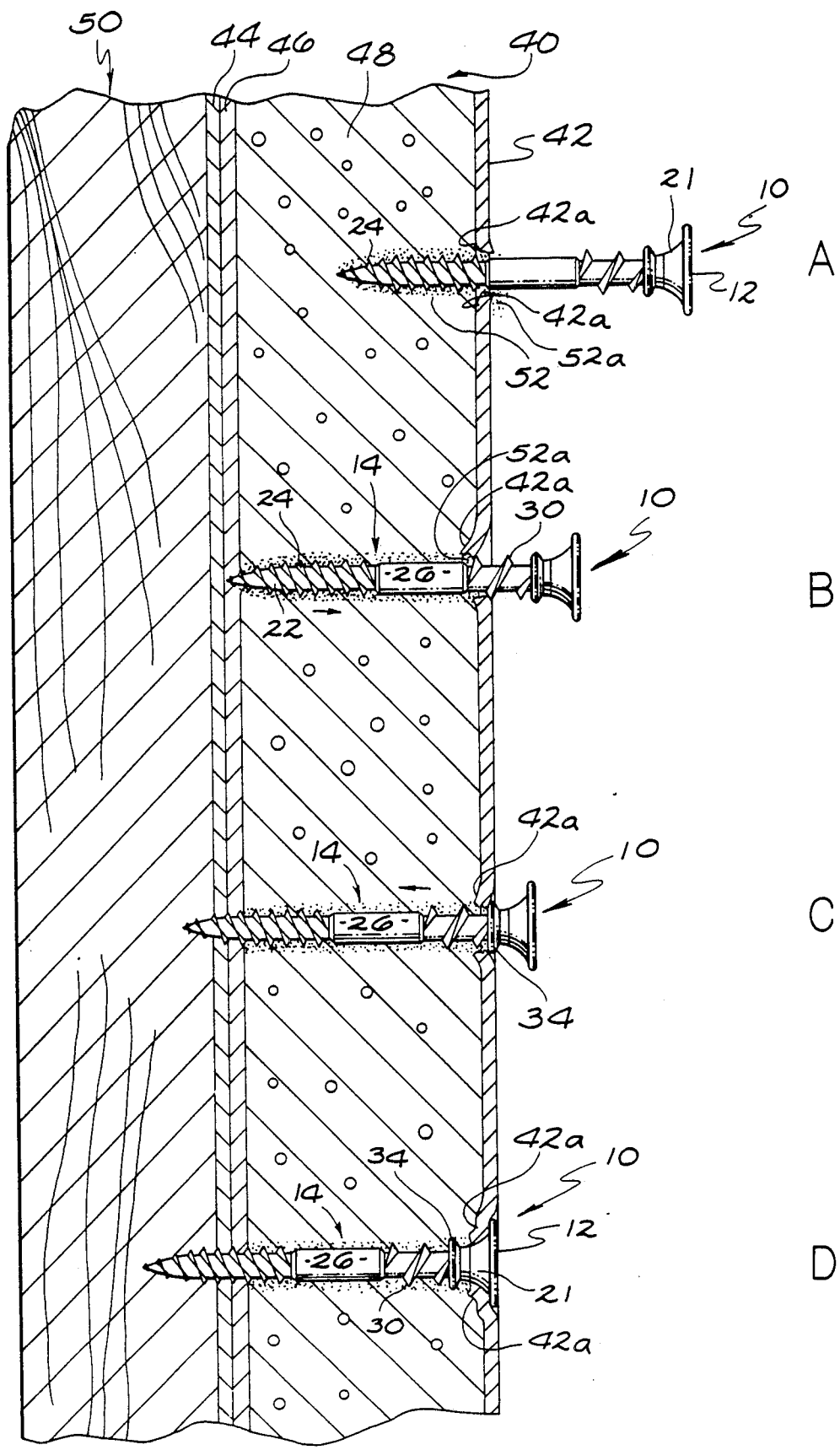

FASTENER ELEMENT

FIELD OF THE INVENTION

The present invention relates generally to threaded fasteners and more particularly to self-tapping fasteners for use with wallboard materials, such as gypsum board, which are secured to a supporting structure.

BACKGROUND OF THE INVENTION

Over the years, preformed wall finishing materials such as dry wall gypsum board (commonly referred to as "dry wall"), particle board, masonite and other particulate or fibrous materials have largely replaced plastered walls in commercial and residential buildings.

As opposed to plaster which is applied to a lath base in a semi-liquid state, wallboard is secured to the supporting frame structure by the use of nails or screws. For example, wallboard is attached to wooden thin-wall metal studs by the use of self-tapping "drywall screws".

Drywall is comprised of a sandwich panel of paper exteriors having a gypsum core. The drywall screw is usually comprised of a bugle head and a threaded shank (either with single lead or twin lead threads) having a sharp point or a point with selfdrilling drill flutes for heavier gauge metal studs. Commercially, the screws are inserted by electrically-powered screw guns which rotate at speeds above 2,000 revolutions per minute or greater, and the screw point thus moves rapidly through the soft gypsum board and the outer layers of paper. However, when the screw reaches the metal or wooden stud any hesitation in the axial travel of the drywall screw, while the screw gun continues to rotate, will strip any threads which have been tapped in the gypsum board and, in effect, convert the fastener to a screw auger which reams the gypsum from around the shaft of the fastener, thereby weakening the support for the paper surface. Accordingly, it is not uncommon that the head of the fastener punctures the paper exterior. As the paper provides the integral strength of the wallboard, the breaking of the paper over the screw head weakens the fastening. According to standard building codes, the fastening is deemed acceptable only when the dry wallboard has been attached firmly to the supporting stud without spacing voids, with the head of the drywall screws only slightly countersunk. Further, codes require that the fastener, when seated, does not cut underneath the head for the full 360 degrees of the head diameter. In commercial applications, whenever excessive gypsum has been augered from the drywall board or the head of the dry wall screw fails to properly tuck the exterior surface paper for any reason, additional labor is required to properly secure the wallboard-supporting structure, and to properly repair blemishes formed in the paper surface.

Further, it is not uncommon to find paper burrs around the head of a seated drywall screw which result from a tendency of the outer paper layer to "ride" the inclined plane of the bugle head and overlap the top surface of the seated screw.

Numerous approaches to correct these problems have been taken. For example, U.S. Pat. Nos. 3,703,843; 3,861,269 and Re. 28,111 to Laverty teach a drywall screw having a shank with a first continuous thread from the point to the head and a second parallel thread intermediate the first thread only on the point end of the fastener. The thread toward the head end of the shank has increased thread spacing between adjacent thread portions and a greater crest diameter than the initial threads, and this construction is said to result in less deformation of the particulate wallboard filler and increased holding power. U.S. Pat. No. 3,942,405 to Wagner describes a screw having multiple threads so that the initial penetration of the screw into the supporting structure is accelerated.

SUMMARY OF THE INVENTION

The present invention provides a self-tapping fastener which is particularly useful in securing a particulate workpiece such as drywall to a supporting structure having a greater density than the workpiece. The fastener includes a shank, a head at one end of the shank, and a tapered point at an opposite end. The shank has a first portion including the tapered point and a second portion disposed axially toward the head of the fastener, the first portion having thread convolutions extending from the tapered point, spiraling in a first direction, and terminating prior to the second portion. The second portion has thread convolutions spiraling in a reverse direction to the threads on the first portion. Preferably, the crest diameter of the reverse threads on the second portion is greater than the crest diameter of the threads on the first portion.

Further, a method is provided whereby the reverse threads on the second portion auger the exhausting particles into the opening formed by the fastener, and pack or compress the particles around the fastener to provide greater holding power after the fastener has been fully inserted into the structure. The threads on the first portion accommodate easy initial entry into the workpiece, and partially form threads on the more dense material. At this point, during which the axial movement of the fastener toward the workpiece is impeded, the first portion entry threads may auger the particulate material toward the head portion of the fastener. When the tapered point and entry threads have reached the support structure, the reverse threads on the second portion begin to auger the exhausting material toward the workpiece, and as the fastener becomes fully seated in the workpiece the exhausting material is repacked around the fastener shank. Preferably, an unthreaded third shank portion disposed between the first and second portions acts as a relief area for recompaction of the exhausting gypsum or other particulate material.

In another aspect of the invention, an annular ring flange disposed on the shank adjacent the head portion of the fastener and having a diameter greater than the crest diameter of the shank threads of the fastener tucks the surface of the paper evenly beneath the fastener head to avoid paper burrs.

BRIEF DESCRIPTION OF THE DRAWINGS

FIG. 2 shows a fragmentary sectional view of the fastener of the invention penetrating a workpiece of drywall and the supporting structure.

DETAILED DESCRIPTION OF THE PREFERRED EMBODIMENT

Figure 1:
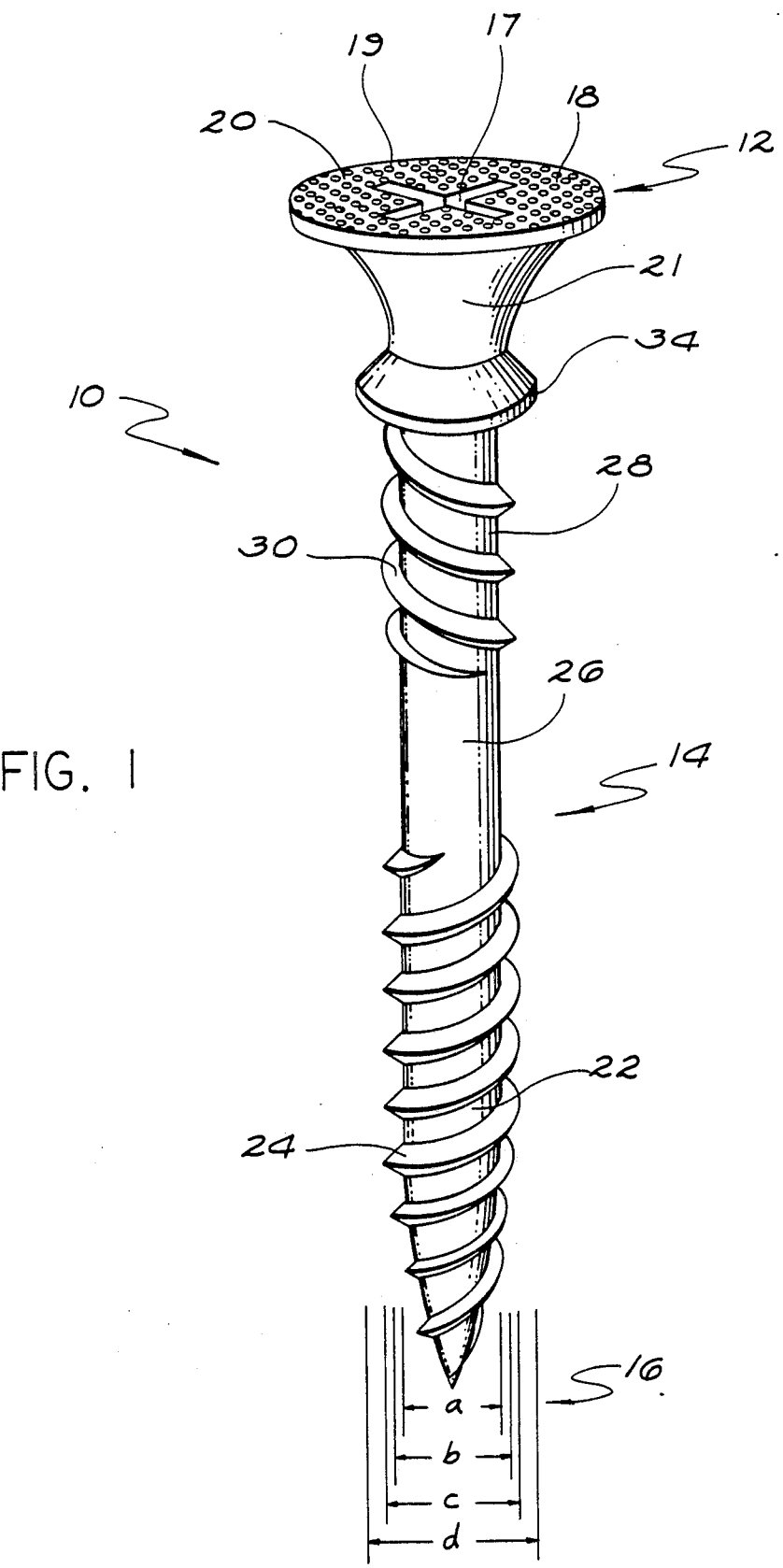
FIG. 1 is a perspective side elevation of the preferred embodiment of the fastener of the present invention.

This invention is susceptible of embodiment in many different forms, and while one specific embodiment will be described and shown in the drawings it should be understood that the present disclosure is to be considered as an exemplification of the invention and is not intended to limit the invention to the preferred embodiment.

Referring to the drawings, FIG. 1 shows a screw 10 having an enlarged head 12 at one end of a shank 14 and a tapered point 16 at the opposite end of the shank.

The head 12 includes a recess 17 for receiving a driving element, and is specifically shown to be designed to receive a Phillips-head screw driver. The outer surface 18 of the head is seen to include a plurality of peaks 19 and valleys 20 which combine to provide a corrugated surface to the head 12. This surface may be formed by stamping or milling individual projections, or grid-like ridges or valleys, on the surface 18. Such a corrugated surface has been found to provide superior seating and retentive properties for the joint compound which is employed to finish the depression left by the screw 10 in the wallboard. The head 12 is also seen to include an arcuately conical portion 21 which converges toward the shank 14. This head 12, in combination with the portion 21, is commonly referred to in the art as a "bugle" head, and the surface 21 serves as the sole compacting surface on traditional drywall screws.

The screw 10 includes a first threaded portion 22 which includes the tapered point 16 and tapping thread convolutions 24 which spiral toward and terminate adjacent the point 16. The tapping thread convolutions have a root or minor diameter "a" and major or crest diameter "b" and the respective diameters gradually decrease in diameter and thread height in the tapering portion and terminate at the point 16.

An unthreaded shank portion 26 is seen to be disposed above the tapping threaded portion 22. The portion 26 in this embodiment is seen to have a diameter equal to that of the root diameter "a".

Disposed above the unthreaded shank portion 26 is a second threaded portion 28 having thread convolutions 30 which are seen to extend spirally in a reverse direction to that of the threads 24 on the first portion 22. The minor or root diameter of the threads 30 are seen, in FIG. 1, to be identical to the shank diameter "a", and the major or crest diameter "c" of the threads 30 is seen to be greater than the crest diameter "b" of the threads 24. Preferably, the pitch of the thread 30 is greater than the pitch of the threads 24. The thread 30 decreases in thread height at the initial convolution 32 and is seen to taper, in FIG. 1, into the unthreaded shank portion 26.

Disposed at the end of the shank 14 opposite to the pointed end 16 is an annular ring flange 34. The flange 34 has a diameter "d" greater than the crest diameter "c" of the thread 30.

More specifically, a No. 7 drywall screw made in accordance with the present invention and adaptable for securing ⅝ inch drywall to a metal stud has an overall length of 1.25 inches, and a head diameter of 0.334 inch.

The fastener is formed by utilizing a blank having an initial uniform diameter of about 0.117 inch which is deformed by rolling to produce the finished screw. Since the unthreaded portion 26 is not deformed by thread forming ridges, the diameter of the portion 26 will remain unchanged in the embodiment shown in FIG. 2. The point 16 of the shank has a point angle of about 26 degrees, and the first portion 22, that is, the tapping or point thread portion, has a length of about 0.690 inches. The threads on this portion spiral clockwise and have a minor and major diameter of about 0.098 and 0.148 inches, respectively, and a pitch of 17 threads per inch.

The intermediate unthreaded portion 26 remains at the initial shank diameter of 0.117 inches, and has a length of about 0.175 inches. It should be understood that while this unthreaded intermediate portion 26 provides advantages in that it acts as a relief area for the recompaction of gypsum, as later described, in other embodiments this unthreaded portion may be omitted entirely while providing the benefits of the invention. In instances where the unthreaded intermediate portion is employed, however, the clockwise point threads 24, and the anti-clockwise reverse-augering threads 30, each taper to the diameter of the portion 26, that is, the initial diameter of the fastener shank.

The reverse-augering thread 30 has a minor and major diameter of about 0.098 and 0.161 inches, respectively. The thread 30 spirals in an anti-clockwise direction, that is, a reverse direction to the point thread 24, for a length of about 0.216 inches. The pitch of the thread 30 is eight thread convolutions per inch.

The annular ring flange 34 has a diameter of about 0.182 inches, a maximum axial thickness of about 0.011 inches, and has a facing edge 36 which is perpendicular to the axis of the fastener 10 and is positioned about 0.2 inches from the upper surface of the head 12.

It should be understood that while the embodiments described show a single lead point thread, alternative point thread styles, such as twin lead threads or other modifications as are known in the art are within the spirit of the invention.

Turning now to FIG. 2, the fastener 10 and its use will be further explained in more detail.

Turning now to FIG. 2, the use of a drywall screw of the present invention will be described in more detail.

Drywall screws are generally held to the end of a screw gun by a magnet or mechanical device, and the operator inserts the screw by operating the screw gun at high speed while pressing the screw into the gypsum board. FIG. 2 shows a sectional view of a portion of a sheet of gypsum board 40. The gypsum board is seen to comprise an outer sheeting layer 42, two inner sheeting layers 44 and 46, and an intermediate gypsum core 48. The sheeting layers are most generally layers of industrial paper. The gypsum board 40 is seen to abut a wooden stud 50.

Theoretically, as the screw 10 at "A" initially proceeds through the paper 42 and the gypsum core 48, the threads 24 should cleanly tap mating threads in the core 48. However, it will be understood that due to the pressure exerted on the screw-head 12 by the operator, the rapid turning of the screw shank 14, and/or slight variations in the angle of the shank 14 with respect to the surface of the wallboard 40 (i.e., "wobble" of the screw 10 during insertion), a substantial portion of the gypsum core 48 immediately surrounding the threads 24 may be pulverized to form minute gypsum particles 52 within the gypsum core 48 adjacent the shank 14. Further, to the extent that the rotation of the screw exceeds the rotation required by the helix angle of the threads 24 for the distance of travel through the gypsum board 40, portions of the particulate gypsum 52 may be augered beyond the outer paper layer 42, as designated by the reference numeral 52a. Similarly, the edges of the paper layer 42 may be outwardly elevated (as shown by the reference numeral 42a) by the augering action of the threads 24. Absent the reverse augering action of the reverse thread convolutions 30 or the tucking effect of the annular ring flange 34, this elevation of the paper 42 may be continued until the conical surface 21 of the bugle head 12 reaches the elevated edges 42a whereupon the edges 42a are further expanded and torn by the conical surface 21 to produce paper burrs which are not uncommon with the use of previously known gypsum board screws.

At "B", the drywall screw 10 is seen to have penetrated the inner paper layers 44 and 46, and has begun to tap into the stud 50. At this point, to the extent that the axial motion of the screw 10 is substantially impeded while the rotational velocity is maintained, the augering action of the gypsum particles 52a by the threads 24 is increased and the particles are further directed toward the outer paper layer 42 of the gypsum board 40, as indicated by the arrow adjacent the portion 22.

However, according to the present invention, the anti-clockwise thread convolutions 30 of the screw 10 have engaged the outer paper layer 42 and the gypsum particles 52a and have begun to auger the particles 52a downwardly around the shank 14 and inhibit the upwardly augering action provided by the threads 24. The increased pitch of the threads 30 increases the rate of this reverse-augering action. In addition, the threads 30 are seen to tuck the paper 42 (as shown by the reference numeral 42a) downwardly along the shank 14. In addition, the unthreaded intermediate shank portion 26 is seen to provide additional advantages in that it allows a relief area for recompaction of the gypsum particles 52.

At "C", the screw 10 has proceeded further inwardly through the stud 50, and the gypsum particles 52 are seen to be further compacted (as indicated by the arrow adjacent the portion 28) in the space surrounding the shank 14 and, in particular, the unthreaded intermediate portion 26. In addition, the edges 42a of the outer paper layer 42 are shown to be tucked inwardly by the annular ring flange 34, and further compaction is thus provided to the particles 52. Finally, at "D" the screw 10 is seen to be inserted to its resting position. The paper edge 42a having been tucked inwardly by the anti-clockwise threads 30 and the annular ring flange 34, is seen to be tucked evenly beneath the screw head 12 along the arcuately conical surface 21. The threads 30 are seen to have compacted the gypsum particles 52 along a substantial portion of the length of the shank 14. Since the area surrounding the shank 14 is recompacted with gypsum particles, the bugle head 12 of the screw is permitted to compact any remaining gypsum particles to provide a firm base beneath the bugle head 12, without proceeding inwardly to the point where the head 12 punctures the paper layer 42.

From the foregoing description, one skilled in the art can readily ascertain the essential characteristics of the invention and, without departing from the spirit and scope thereof, can adapt the invention to various usages and conditions. Changes in form and the substitution of equivalents are contemplated as circumstances may suggest or render expedient; and although specific terms have been employed herein, they are intended in a descriptive sense and not for purposes of limitation, the purview of the invention being delineated in the following claims.

I claim:

1. A fastener, comprising a shank and a head at a first end of the shank and a tapered point at an opposite end, the shank having a first portion including the tapered point and a second portion disposed axially toward the head of the fastener, the first portion having thread convolutions extending from the tapered point spirally in a first direction and terminating prior to the second portion, and the second portion having thread convolutions spiraling in a direction which is reverse to that of the threads on the first portion; wherein the head of the fastener is a bugle head having a lateral surface which diverges outwardly from the axis of the fastener and toward the first end, and wherein the fastener further includes an annular ring flange disposed on the shank prior to the divergence of the lateral surfaces of the head, the flange having a diameter which is greater than the major diameter of the reverse threads on the second portion and less than the maximum diameter of the bugle head.

2. The fastener of claim 1 wherein the fastener further includes an unthreaded third shank portion disposed between the first and second portions.

3. The fastener of claim 2, wherein the major diameter of the reverse threads of the second portion is greater than the major diameter of the threads on the first portion.

4. The fastener of claim 1 wherein the major diameter of the reverse threads of the second portion is greater than the major diameter of the threads on the first portion.

5. A fastener, comprising a shank, a bugle head having lateral surfaces which diverge outwardly from the shank toward a first end of the fastener, and a tapered point at an opposite end, the shank having continuous tapping thread convolutions extending spirally from the tapered point, and an annular ring flange disposed on the shank prior to the divergence of the lateral surfaces of the bugle head, the flange having a diameter which is greater than the major diameter of the tapping threads and less than the maximum diameter of the bugle head.

6. The fastener of claim 5 wherein the shank further includes augering threads adjacent the annular ring flange spiraling in a direction which is reverse to that of the tapping threads and extending only to a point of the termination of the tapping threads.

7. The fastener of claim 6 wherein the shank further includes an unthreaded portion between the tapping and reverse augering threads.

8. A method for securing a section of wallboard including particulate matter enclosed, in part, by an outer layer of sheeting to a supporting structure, the method comprising the steps of:
   introducing into the wallboard, through the outer sheeting layer, a fastener having a shank with a head at a first end and a tapered point at an opposite end, the shank of the fastener having a first portion including the tapered point and a second portion disposed axially toward the head of the fastener, the first portion having tapping thread convolutions extending from the tapered point and spiraling in a first direction and terminating prior to the second portion; the second portion having thread convolutions spiraling in a reverse direction to the threads on the first portion; the fastener further including an annular ring flange disposed on the shank prior to the divergence of the lateral surface of the head;
   rotating the fastener so that the tapered point proceeds through the wallboard toward the supporting structure;
   causing the reverse threads on the second portion of the fastener to engage the particulate material in the wallboard and auger the particulate material around the shank toward the supporting structure; and
   causing the flange to tuck the outer layer of sheeting away from the head portion during the initial penetration of the head portion beneath the exterior surface of the wallboard.

* * * * *